UNITED STATES PATENT OFFICE.

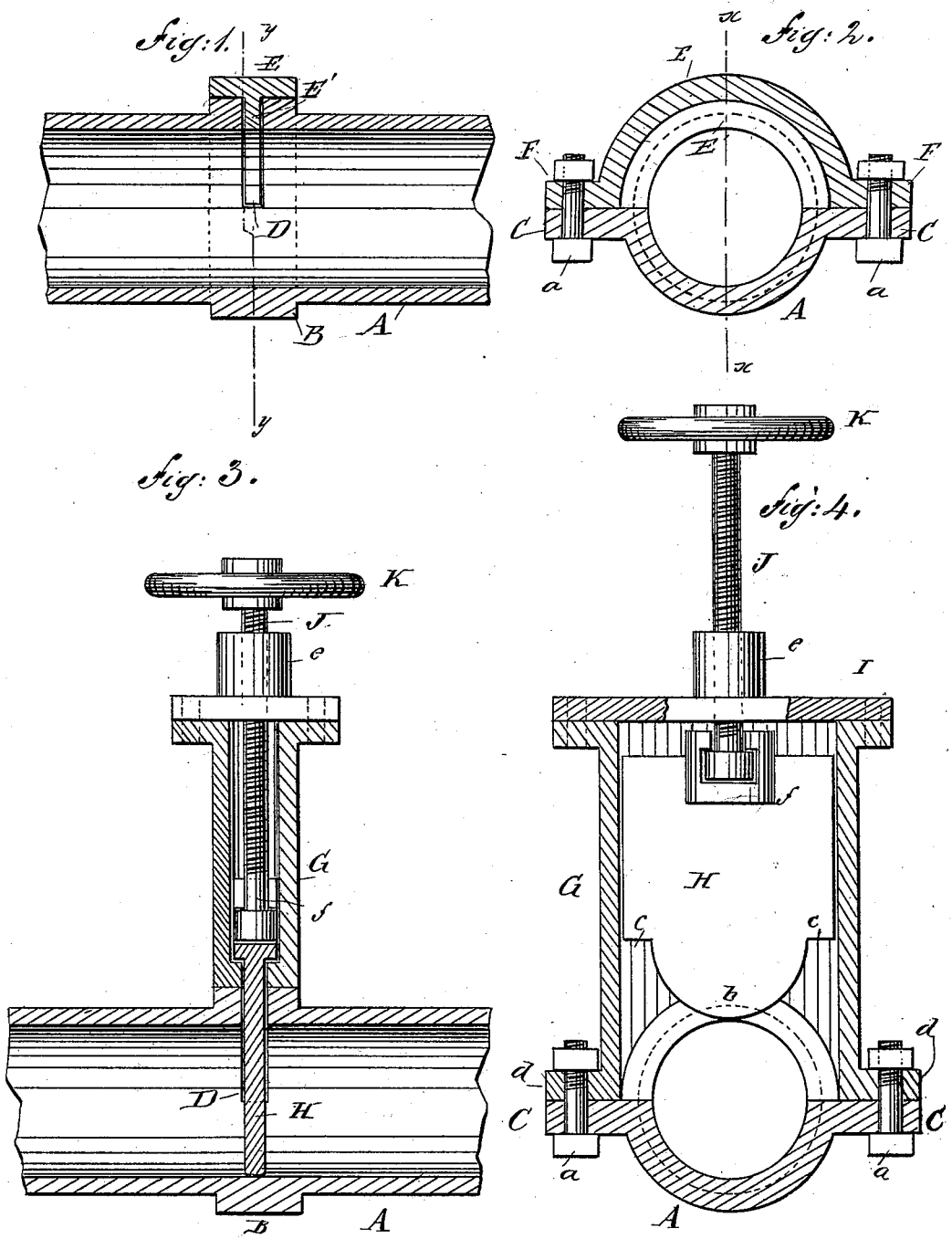

CHARLES H. SHEPHERD, OF NEW YORK, N. Y.

GATE-VALVE.

SPECIFICATION forming part of Letters Patent No. 400,128, dated March 26, 1889.

Application filed February 28, 1888. Serial No. 265,566. (No model.)

*To all whom it may concern:*

Be it known that I, CHARLES H. SHEPHERD, of the city, county, and State of New York, have invented a new and Improved Gate-Valve, of which the following is a specification, reference being had to the annexed drawings, forming a part thereof, in which—

Figure 1 is a longitudinal section on line *x x* in Fig. 2 of a pipe adapted to receive my improved gate-valve. Fig. 2 is a transverse section taken on line *y y* in Fig. 1. Fig. 3 is a longitudinal section of a pipe with my improved valve applied, and Fig. 4 is a transverse section of the same.

Similar letters of reference indicate corresponding parts in all the views.

The object of my invention is to provide a removable gate-valve for temporary application to pipes—such as drain and sewer pipes.

My invention consists in the combination, with a transversely-slotted pipe provided with a collar formed integrally with the pipe, and having apertured ears, of a cover adapted to close the slot of the pipe, and a gate-valve adapted to the slot and bore of the pipe, all as hereinafter more fully described, and pointed out in the claims.

The pipe A is provided with a collar, B, formed integrally with the pipe, and with apertured ears C projecting from the collar upon diametrically-opposite sides of the pipe. In the pipe A and collar B is formed a slot, D, at right angles to the axis of the pipe, the said slot reaching from the top of the pipe down to the plane of the ears C.

To the collar B is fitted a semicircular cover, E, provided with a rib, E', fitting into the slot D, and with apertured ears F, the said ears corresponding in form and size with the ears C. The cover E is secured in place upon the pipe by bolts *a* passing through the ears C F.

To the slotted portion of the collar B and to the ears C is fitted a valve-casing, G, containing a gate-valve, H, adapted to pass through the slot D and close the pipe A, the said valve having a downwardly-convex edge, *b*, adapted to fit into the lower part of the pipe, and provided with shoulders *c*, which close down upon the edges of the pipe adjoining the ears C. The casing G is of an internal diameter equal to the external diameter of the pipe, and is provided with apertured ears *d*, and the said casing is secured to the pipe by the bolts *a*, which pass through the ears C *d*. The casing G is provided with a cover, I, having at the center thereof an internally-threaded boss, *e*, for receiving the screw J. The lower end of the screw J is connected by a swivel, *f*, with the gate-valve H. The upper end of the screw J is provided with a hand-wheel, K, by which it may be turned.

Ordinarily the cover E will remain secured in place upon the pipe A, as shown in Figs. 1 and 2; but when from any cause it is desired to shut off a portion of the pipe to repair or clean another portion the cover E is removed, the casing G attached to the pipe A in place of the said cover, and the gate-valve H is forced down into the slot D, thereby closing the pipe A.

By means of my improvement I avoid the difficulty common to ordinary gate-valves, which in time become corroded and are found difficult to operate.

Having thus described my invention, I claim as new and desire to secure by Letters Patent—

1. The combination, with the pipe A, provided with the collar B, the apertured ears C, and the transverse slot D, of the semicircular cover E, provided with the central rib, E', fitting in the slot D, and with the apertured ears F, resting upon and bolted to the ears C of the pipe, substantially as herein shown and described.

2. The combination, with a transversely-slotted pipe, of an interchangeable cover and casing adapted to be secured to the pipe over the slot, the cover being provided with a rib and the casing with a sliding valve to enter the slot of the pipe when the cover or casing is in place, substantially as described.

CHAS. H. SHEPHERD.

Witnesses:
   GEO. M. HOPKINS,
   EDGAR TATE.